US008056594B2

(12) United States Patent
Jung

(10) Patent No.: US 8,056,594 B2
(45) Date of Patent: Nov. 15, 2011

(54) LONG DRIVE PATCH FOR TIRE PUNCTURE

(76) Inventor: Man-Young Jung, Pasadena, CA (US)

( * ) Notice: Subject to any disclaimer, the term of this patent is extended or adjusted under 35 U.S.C. 154(b) by 887 days.

(21) Appl. No.: 12/082,614

(22) Filed: Apr. 11, 2008

(65) Prior Publication Data

US 2009/0255617 A1    Oct. 15, 2009

(51) Int. Cl.
*B29C 73/12* (2006.01)
*B29C 73/30* (2006.01)
*B29C 73/10* (2006.01)
(52) U.S. Cl. .......................... 152/368; 152/367
(58) Field of Classification Search .................. 152/367, 152/368; *B29C 73/10, 73/12, 73/30*
See application file for complete search history.

(56) References Cited

U.S. PATENT DOCUMENTS

| 1,276,179 A * | 8/1918 | Copps | 152/368 |
| 1,359,380 A * | 11/1920 | Horine | 152/368 |
| 1,458,053 A * | 6/1923 | Handly | 152/368 |
| 1,624,619 A * | 4/1927 | Moore | 152/368 |
| 5,629,065 A * | 5/1997 | Schinabeck | 428/63 |
| 6,775,894 B2 * | 8/2004 | Hardin | 29/402.09 |
| 7,740,035 B2 * | 6/2010 | Fowler-Hawkins | 152/381.5 |

\* cited by examiner

*Primary Examiner* — Justin Fischer
*Assistant Examiner* — Philip N Schwartz
(74) *Attorney, Agent, or Firm* — Clement Cheng

(57) ABSTRACT

An external puncture sealing patch for a vehicle tire is provided. The patch comprises a thin spiked pad made of flexible base and a number of sharp pins partially implanted in the base in a radial arrangement around a central void protruding vertically downward from the bottom surface of the base for penetratively engaging a depth of the tire about its puncture upon depression onto the top surface of the base. A thick coat of an elastomeric sealant is added to the spiked side of the patch for sealingly adhering the spiked pad to the tire as the sealant fills any irregular clearances between the spiked pad and tire to reinforce the attachment thereof. In order to keep the patch effective for an extended period of time, the patch is also provided in a contained form whereby the patch in a dual-purpose container can be quickly deployed at the time of need for application to a tire puncture in a safe and comfortable manner.

8 Claims, 6 Drawing Sheets

LONG DRIVE PATCH FOR TIRE PUNCTURE

BACKGROUND OF THE INVENTION

A. Field of the Invention

The present invention relates to vehicle tire maintenance. More particularly, the present invention relates to a tire puncture treatment patch that can be applied directly or through an instant applicator to permit a temporary long drive of the wheeled vehicles including automobiles and motorcycles.

B. Description of the Prior Art

As roads and parking lots are becoming more crowded and littered with more trashes, there are increasing numbers of vehicle tires injured by stepping on careless nails, screws and other sharp objects or criminal vandalism, just when more driving miles to the destination or a service station are desperately wished for. At the occurrence of a puncture, the tire eventually looses the air pressure and results in a critical lost control of the vehicle at that wheel support.

Traditionally, adhesive patches have been used to cover tire punctures. But because the adhesive force only cannot block the punctured area from the external tread side against the high pressure leak of the air lifting the vehicle the injured tire had to be demounted from wheel rim to cover the injuries from both the inside and the outside of the tire which needs a professional grade of equipments and industry standard skill beyond an immediate roadside remedy. Although known to be an unacceptable repair by itself, rubber plugs have been used in an attempt to block punctured holes in the tire. However, it hardly becomes a good emergency remedy due to a tedious pretreatment required with respect to removal of the puncturing nails and such hazardous objects. Especially in harsh weather, it might be impossible to take time outside of the vehicle to follow the necessary steps recommended.

Other available quick remedies include aerosol inflators that contain fluid sealant under pressurized air that is injected into the tire through the tire valve. Although they are supposed to provide a temporary, emergency repair to help get the vehicle off the road traffic and to the nearest tire repair facility, they create an inconvenient remnant for the service personnel who must be informed of the use of such material to eventually remove it completely before starting a repair job. That might create an extra difficult job due to permeations of the liquid under the high tire pressure in the tire structure through the puncture path. Further, some aerosol products of this type use flammable gases, such as butane, propane or isobutene as propellants, which are the environmentally hostile and critically unsafe to the highly frictional tire component in a vehicle.

With these conventional methods, once the particular nail hole is temporarily blocked to hold air in the tire it might be easy to ignore the invisible injury until after the insufficient repair causes sudden tire failure at the end of continued air loss. To prevent such incident, there is also a need for a clear indicator to prompt a timely visit to a service station for proper repair.

So, the presently available solutions are more suitable to non-emergency situations where the vehicle is affordable to be towed to the service station. In the service station, the tire is supposed to be demounted from the wheel for inspection to determine whether a permanent repair is feasible compared to a replacement. In the first step to condition the tire for treatment, the damaging object must be removed as any remnants from emergency treatment are cleared from the unit body of tire. To be considered a permanent repair of a tire, a combination patch and plug has been recommended wherein a vulcanizing stem is used to fill the tire injury and the proper sized tire repair patch reinforces the inner liner of the tire.

Therefore, a practical temporary tire patch that is compatible to this standard practice is necessary to allow even the inexperienced vehicle owners to treat the vehicle punctures right for a safe long drive as well as a future permanent professional repair. Still, such patch treatment is advantageously visible to naked eyes to remind getting a professional repair in reasonable time for the safety of the driver and vehicle.

In view of the foregoing, an object of the present invention is to provide a combination of an external tire patch with a novel multi-needle hold and an extra sealing means that instantly envelops the puncture injury in a positive manner to provide a longer and safer containment of tire air over an extended temporary drive.

Another object of the present invention is to provide an emergency long drive patch for tire puncture that is easy even for a novice vehicle operator to apply and is more agreeable to the permanent repair through a cleaner removal compared to prior art aerosol inflators.

Yet another object of the present invention is to provide a self-contained tire emergency patch and applicator combined which is easy and safe to handle and cheap to make.

Yet another object of the present invention is to provide a tire puncture patch that is clearly visible to prompt a timely visit to a service station for proper repair.

SUMMARY OF THE INVENTION

The present invention provides an external puncture sealing patch for a vehicle tire in its simpler preferred embodiment. The patch comprises a thin flexible base for attachment to the exterior of the injured tire, the base having a top surface and a bottom surface; a number of sharp pins partially implanted in the base in a radial arrangement around a central void protruding vertically downward from the bottom surface of the base to form a large spiked pad for penetratively engaging a depth of the tire about its puncture upon depression onto the top surface of the base; and a thick coat of an elastomeric sealant on the bottom surface of the base for sealingly adhering the spiked pad to the tire as the sealant fills any irregular clearances between the spiked pad and tire to reinforce the attachment thereof.

The sealing patch may also comprises an airtight container for holding the patch effective for an extended period of time before an emergency application of the patch to a tire puncture. The base may be molded of a molten rubber material similar to the tire with the pins partially immersed in the molten material to finish the spiked pad in a single step. The pins may be conventional metal thumbtacks. Alternatively, the pins may comprise a plurality of sharp elements of metal each having dual prongs and a flattened head connecting the two prongs.

The base may be made of two identical layers bonded together, the respective layers having a number of concentric annular grooves facing inwardly of the base in an opposing manner for firmly holding the implanted pins by an extra amount of glue that fills the grooves and the rest of the opposing layers. Simply, the base may be made of two flat layers bonded together by thick glue, through which the implanted pins penetrating one of the two layers while the other layer provides an enlarged press surface for manual or mechanical depression onto the tire.

In another embodiment of the present invention, a contained patch for an external application to a puncture of a vehicle tire is provided. In addition to all the components of the spiked pad of the first embodiment, the contained patch comprises a plunger for protectively containing the spiked pad before its application. The plunger has a shell extending generally vertically and centrally opened to receive the spiked pad; a pusher partially received in the shell so that it normally extends above the shell and abuts at least partial areas of the top surface of the base of the patch where the pins are implanted; an elongated top lid to the shell for removably capping the pusher until it acts on the spiked pad during application; and a bottom closure removably capped on the shell from below.

Therefore, an operator may hold the spiked pad by the plunger in one hand with the top lid and bottom closure removed to press the pusher with the thumb of the same hand or with another hand along a straight path onto the patch centrally aligned to the tire puncture to seal the same.

In yet another embodiment of the present invention, a contained patch for an external application to a puncture of a vehicle tire is provided with a more compact applicator/container. In addition to all the components of the spiked pad of the first embodiment, the contained patch comprises an applicator for protectively containing the spiked pad before its application. The applicator comprises: an outer shell in a low profile including a top plain an integrally formed central push rod with a bottom opening extending above and below the top plain, a short threaded vertical sidewall; an inner shell partially received in the outer shell for a temporary hold of the spiked pad and having a press plate with a central column for joining the inner shell to the outer shell at the bottom opening of the push rod, a vertical peripheral wall and furrows for flexibly connecting the press plate to the peripheral wall; and a bottom lid tightly threaded onto the vertical sidewall of the outer shell. In the tire emergency, an operator may hold the spiked pad by the push rod in a palm with the bottom lid removed to activate the press plate along a tire puncture to seal the same.

The underside sealant after conforming to the tire tread will be cured in a short drive to the tire due to the elevation of tire temperature resulting from high rpm and frictional contact with the pavement. The patch is able to stop airflow through a tire puncture caused by most nail diameters over 3 mm without the nail being removed from the puncture. This stoppage is typically effective for retaining at least about 50 psi of internal pressure within the tire after covering the puncture. Varying the size of the patch of the present invention can seal a wide range of puncture sizes.

Embodiments of the invention will now be described by way of example with reference to the accompanying drawings.

BRIEF DESCRIPTION OF THE DRAWINGS

Similar reference numbers denote corresponding features throughout the attached drawings.

DETAILED DESCRIPTION OF THE PREFERRED EMBODIMENT

Figure 1:
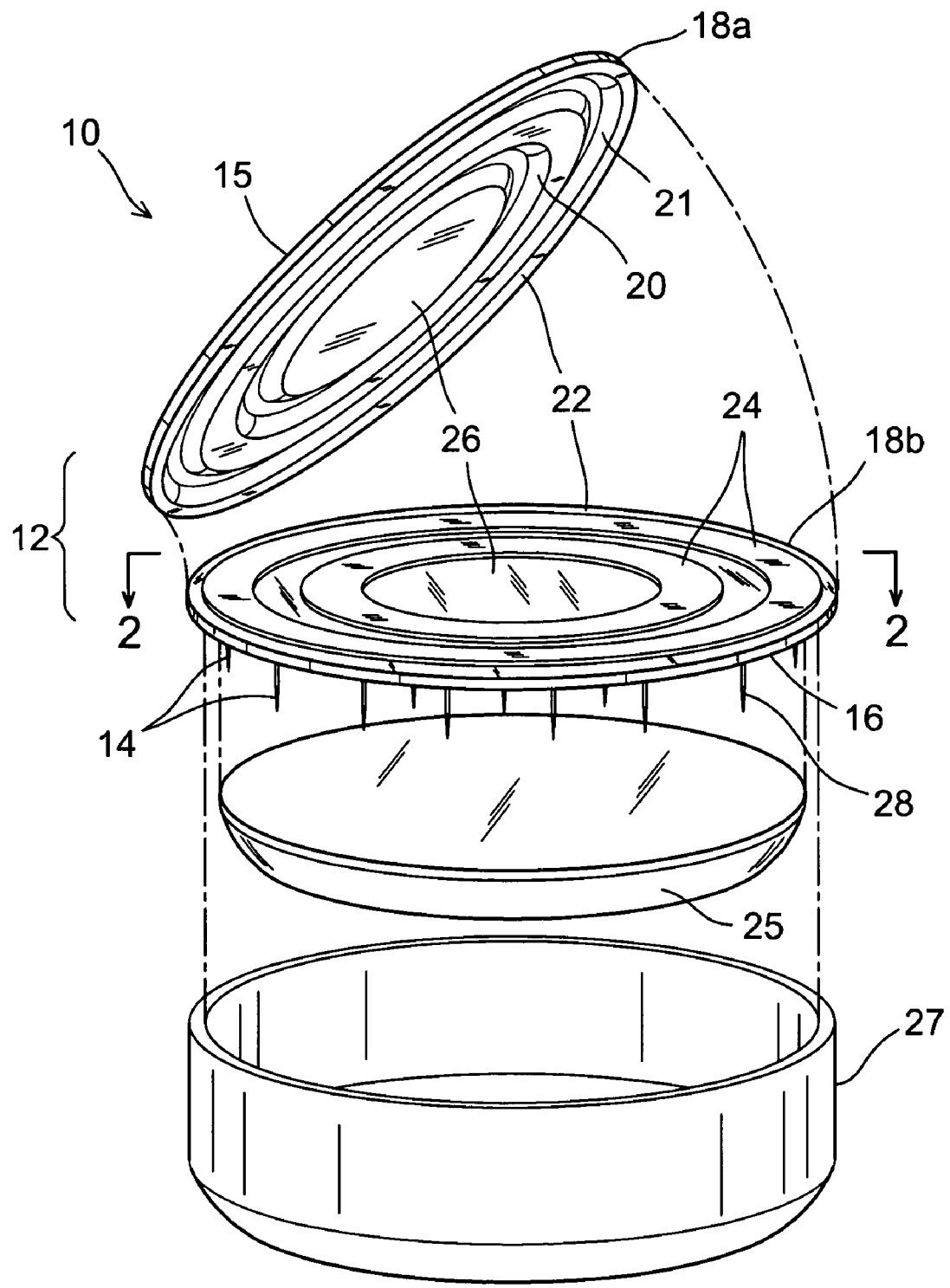
FIG. 1 is an exploded perspective view of an emergency long drive tire patch assembly according to an embodiment of the present invention.
Figure 2:
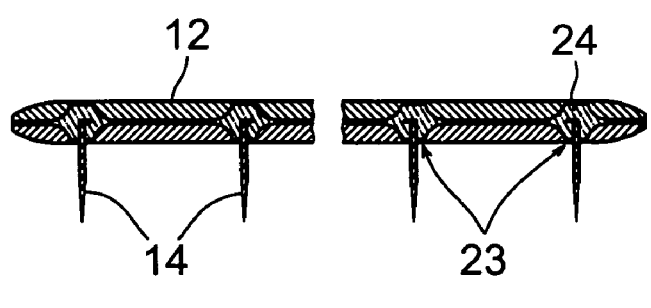
FIG. 2 is a cross sectional view of the tire patch assembly taken along line 2-2 of FIG. 1.

With reference to FIG. 1, a tire patch 10 according to the present invention is shown in an exploded view having a thin base 12 made of tire rubber or other tough substrates of similar characteristics to a tire tread section and multiple sharp pins 14, which are implanted in base 12 to protrude vertically downwardly with respect to the general plane of base 12. Also referring to FIG. 1 base 12 has a top surface 15 and a bottom surface 16 from which sharp metal pins 14 are protruding. In this first embodiment, base 12 is shown to have two superimposed identical layers 18a and 18b each having concentrically shaped annular recesses 20 and 21 at its inner surface 22 for receiving proximal ends or heads of pins 14 when they are vertically penetrating the lower side layer 18b.

Pins 14 may be lined along recesses 20, 21 of a lower layer 18b and depressed through thinned walls 23 of base 12 formed by recesses 20, 21. With proximal parts of pins 14 remained in recesses 20, 21 glue 24 may be applied to slightly overfill recesses 20, 21 and then upper layer 18a is pressed onto the spiked lower layer 18b until the three members of layers 20, 21 and pin set 14 are permanently glued together. Firmly buried in cured glue 24, pins 14 are strongly supported by base 12 depending from it in vertical position.

Alternatively, spiked base 12 may be formed at once through injection molding wherein pins 14 are suspended to protrude into a molding space as a thermoformable base material is introduced to set about pins 14 resulting in an integral spiked tire patch 10.

Figure 3:
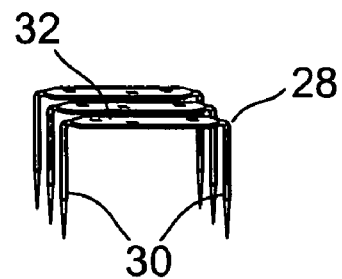
FIG. 3 is a perspective view of a series of pin members assembled with the tire patch of FIG. 1.

Patch 10 is also provided with a smaller round patty of an elastomeric sealant 25 that may stick to bottom 18 covering multiple pins 14 to assist pins 14 in sealingly affixing patch 10 to a tire puncture. Arbitrary positioning of recesses 20, 21 in base 12 where pins 14 protrude is okay provided that a relatively large central area 26 is formed void of pins 14. Pins 14 may comprise a plurality of sharp elements 28 respectively having dual prongs 30 and a flattened head 32 connecting the two prongs 30 as shown in FIG. 3. Flattened head 32 provides an enlarged area for a stronger attachment to base 12 by glue 26. Thus, as a whole, base 12 becomes a large thumbnail for multiple pins 14. With appropriate modifications to conventional methods of manufacturing metal staples, multiple pins 14 may be formed of a single sheet metal and then supplied at once via circumferentially positioned chutes to each of the recesses 20, 21 for assembly.

The finished tire patch 10 may be safely stored in an appropriate airtight hard container 27 and a mating lid (not shown in FIG. 1) to protectively contain sharp elements 28 and prevent sealant 25 from drying up. A sleek sheet may be placed between the sealant block 25 and container 27 to provide a neat separation of the two.

Figure 4:
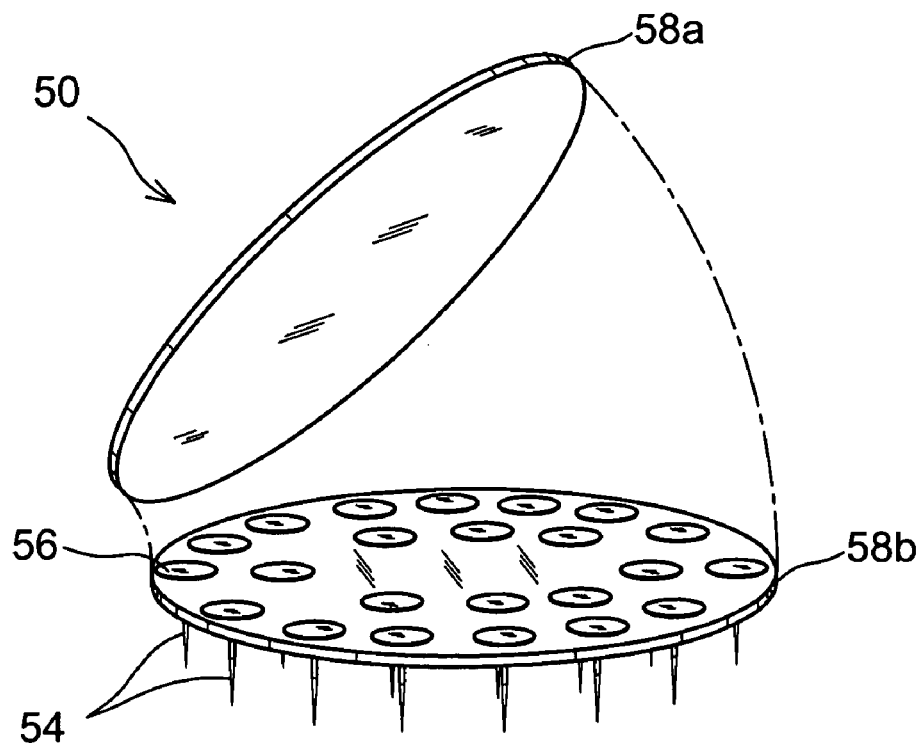
FIG. 4 is an exploded perspective view of an alternative base of a tire patch according to a second embodiment of the present invention.

FIG. 4 shows a second embodiment of the present invention wherein a body of a patch 50 is made by two plain flexible sheets 58a and 58b and multiple thumbtacks 54 with a thin flat head 56. Sheets 58a, 58b may be shaped into a circle, triangle or other polygons. Thumbtacks 54 may be pushed through predetermined positions of lower sheet 58b and a thick coat of flexible glue may be applied to sheet 58b over heads 56 of thumbtacks 54 before upper sheet 58a is attached to form patch 50 with spikes. Then, the similar block of sealant 25 may stick to the spiked side of patch 50 for making it similar to patch 10 of the first embodiment. This method of making patch 50 only uses materials off the shelf and is simple to accomplish.

Patches 10 and 50 in any sealing packages are self sufficient for most vehicle drivers to keep and apply directly to cover a tire puncture. For added convenience in actual use, a protective applicator may be incorporated into the sealing package as will be described below.

Figure 5:
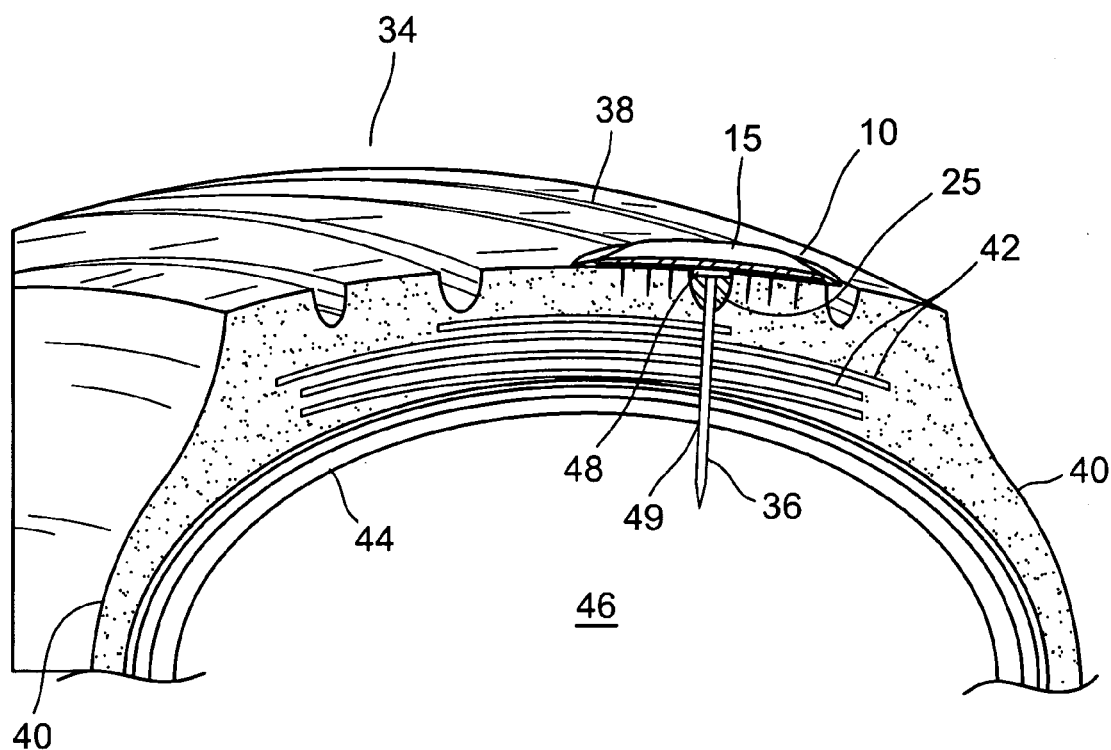
FIG. 5 is a fragmentary cross sectional view of an automobile tire puncture treated with the emergency patch of the present invention.

FIG. 5 illustrates an actual application of tire patch 10 on a pneumatic tire 34 partially shown to suffer from a puncturing nail 36. Tire 34 generally comprises a rubber tread section 38, sidewalls 40, belt layers 42 of cord windings and an inner liner 44 all integrated into a single body during the manufacture. In an unfortunate event, tire 34 attached to a vehicle (not shown) has been injured by nail 36, which extends from tread section 38 into a pressurized air chamber 46 defined in part by inner liner 44. Nail 36 might have been driven with its head 48 pushed hard against an exterior surface of tread section 38.

After rotating the injured spot of tire 34 under the vehicle to a convenient side or top position, patch 10 may be taken out of its container and positioned centrally over nail 36 and then pressed down manually to the top of nail 36. A slight depression will be enough to push in pins 14 due to the thinness of each prong 30 while a strong attachment of patch 10 is provided because of the multiple threading of the numerous sharp elements 28 over evenly distributed region of patch 10 about central area 26. In addition, sealant 25 cooperates with pins 14 as it is automatically spreading over the tread topography by the depression of patch 10 to sealingly cover up any cracks that may channel air through a hole 49 punctured by nail 36. Without needing a wait, tire 34 may be slightly advanced so that patch 10 covering hole 49 is laid down on the ground for setting in position.

Within several turns of tire 34 under the vehicular load, pins 14 will be pushed in tire 34 completely to secure patch 10. With the inventive patch 10 there is no need to remove nail 36 at all in the frustrating emergency situation. Just attaching patch 10 and driving off will do. Besides the discrete metal pins 14, the overall patch 10 is as pliant as tire tread 38 so that patch 10 blends well into tire 34 and behaves as an integral part of the same.

After high speed rolls of tire 34 by the vehicle run, tire 34 becomes hot to expedite curing of the pressed sealant 25 on tread 38 and firmly block hole 49 until a subsequent professional repair job is performed to permanently block the puncture. Because sealant 25 adheres to tire 34 with integrity under patch 10 the future removal of the cured sealant 25 will be neat without having trouble with difficult material remnants to clean. For preparation to repair, a sharp edge of a repair tool may be used to first lift sides of base 12 and then the entire patch 10 including sealant 25 before or after demounting tire 34 from its supporting wheel structure to treat the injury.

Patch 10 of the present invention reinforces tire 34 at the injury to make it near strong as its original condition to allow the vehicle drives semipermanently until the vehicle owner finds a convenient time to visit a repair service that reconditions the tire to operate for its intended service life safely. Meanwhile, the round patch 10 on the exterior of tire 34 constantly reminds the owner visually by providing top 15 and bottom 16 surfaces with distinctive color and/or texture to see the full service tire repair.

Figure 6:
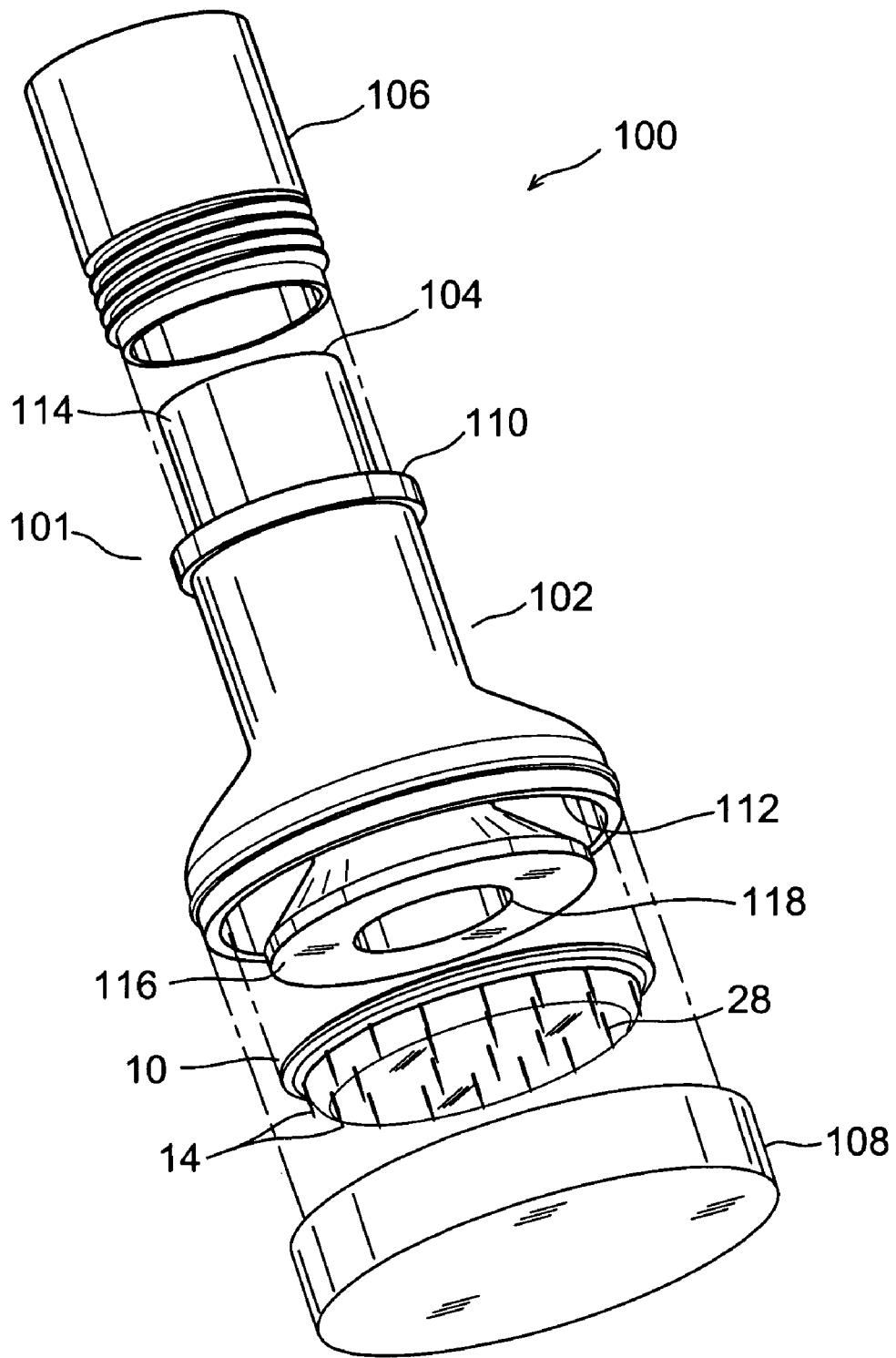
FIG. 6 is an exploded perspective view of an emergency long drive tire patch as shown in FIG. 1 or 4 in a plunger/carrier according to a third embodiment of the present invention.

FIG. 6 shows a contained patch 100 comprising tire patch 10 and an additional plunger 101 for normally containing patch 10 according to a third embodiment of the present invention. In an emergency situation to apply tire patch 10, plunger 101 may be ergonomically held by a side grip of one hand of the operator to help push pins 14 of patch 10 precisely centrally of the tire axis to prevent the sharp elements 28 from being deflected.

In particular, plunger 101 comprises a shell 102 resembling a bottleneck, a pusher 104, a smaller top lid 106 and a larger bottom closure 108. Shell 102 has a narrower top opening 110 and a large bottom opening 112 with an inner diameter slightly smaller than the outer diameter of patch 10 to provide a temporary hold of patch 10. Pusher 104 has a rod section 114 normally protruding from top opening 110 of shell 102 and a cone section 116 positioned on patch 10. Visible through cone section 116 is a large blind hole 118 that extends almost through rod section 114 to lighten the pusher 104. Yet cone section 16 can sufficiently push patch 10 where sharp elements 28 are located radially. Bottom closure 108 tightly but removably covers bottom opening 112. To the top opening 110 of shell 102 top lid 106 may be threadedly tightened to provide an airtight closure of plunger 101.

At an event of the tire puncture, top lid 106 and bottom closure 108 may be removed from shell 102 to reveal patch 10 still held in bottom opening 112. Firmly gripping shell 102 by one hand, a user may position patch 10 to axially align the tire as well as centrally over the puncturing matter and then push the protruded rod section 114 with the thumb of the same gripping hand or the palm of the other hand. Due to the cone section 116 evenly depressing on patch 10, pins 14 can smoothly enter the predetermined depth of the tread section to fix patch 10 in place. Once patch 10 is deployed, plunger 101 may be reused to contain and apply a fresh supply of patch 10.

Figure 7:
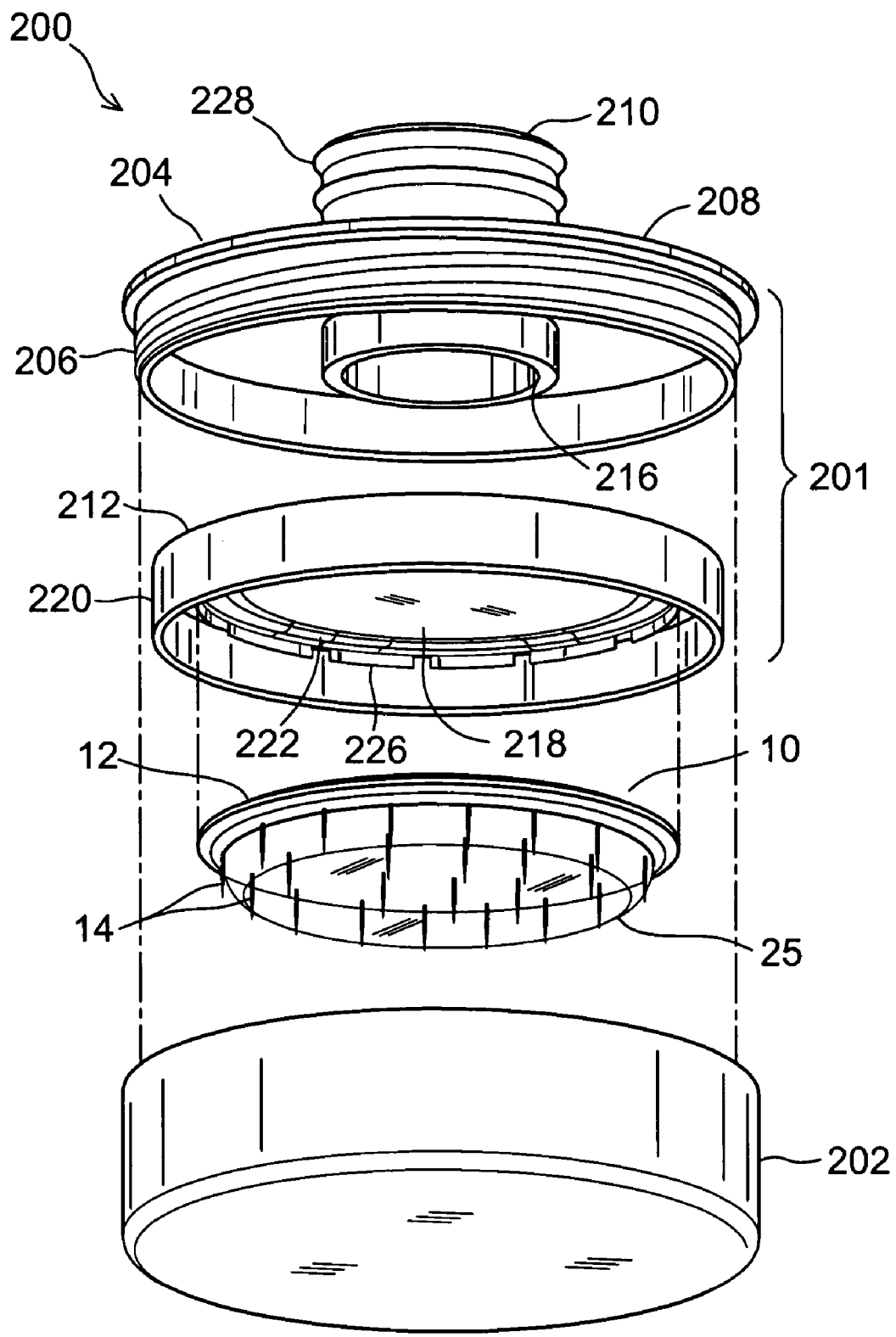
FIG. 7 is an exploded perspective view of an emergency long drive tire patch in an alternative plunger/carrier according to a fourth embodiment of the present invention.

FIG. 7 shows a contained patch 200 comprising patch 10 and a simple palm-press applicator 201 having a lid 202 for sealingly containing patch 10 and applying it to a tire puncture according to a fourth embodiment of the present invention. Applicator 201 comprises a hard outer shell 204 and a threaded sidewall 206 to which lid 202 may be threadedly fastened. Outer shell 204 has a top plain 208 with a hollow push rod 210 extending integrally through it. To evenly distribute the downward force from push rod 210 onto patch 10, a round inner shell 212 may be placed between patch 10 and outer shell 204.

Figure 8:
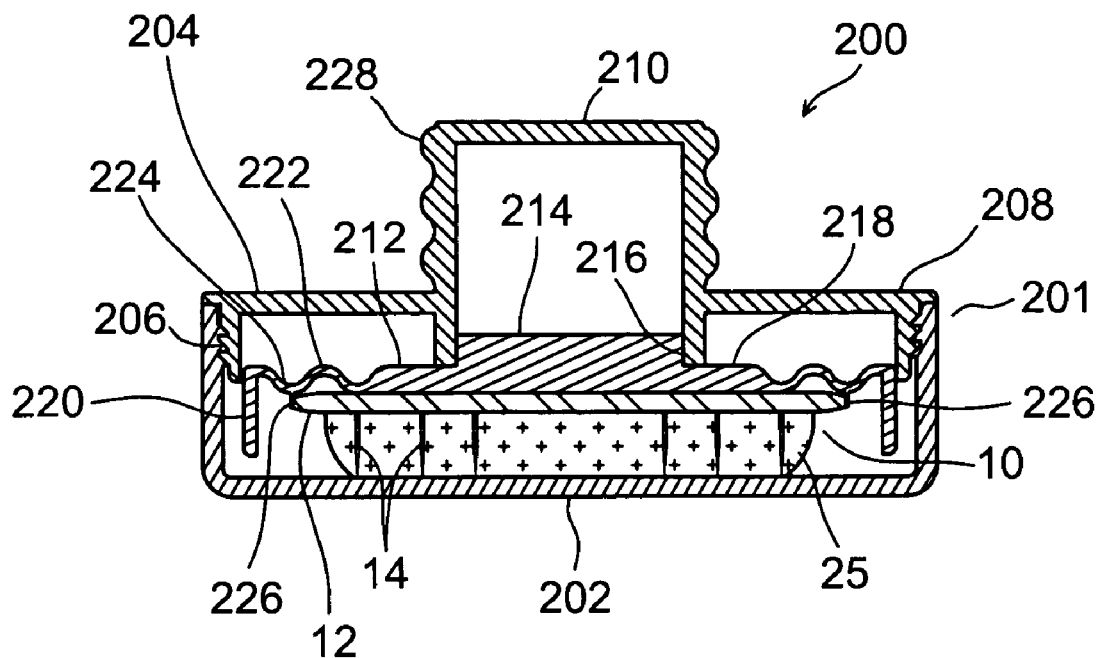
FIG. 8 is a cross sectional view of the tire patch of FIG. 7 in a storage mode in the carrier with an outer shell tightly fastened to a top shell.

Referring further to FIG. 8, inner shell 212 may be shaped like a lid of the same plastic as outer shell 204 and has a short central column 214 for press fitting in a bottom opening 216 of push rod 210. Inner shell 212 also has an annular press plate 218 extending from central column 214 and a vertical peripheral wall 220 that will abut a tire surface about a puncture to support a straight advancement of pins 14 through tire tread section 38. In order to provide the relative movement of press plate 218 with respect to vertical wall 220, an annular folds or furrows 222 of a reduced thickness are formed integral to inner shell 212 connecting press plate 218 and vertical wall 220.

Figure 9:
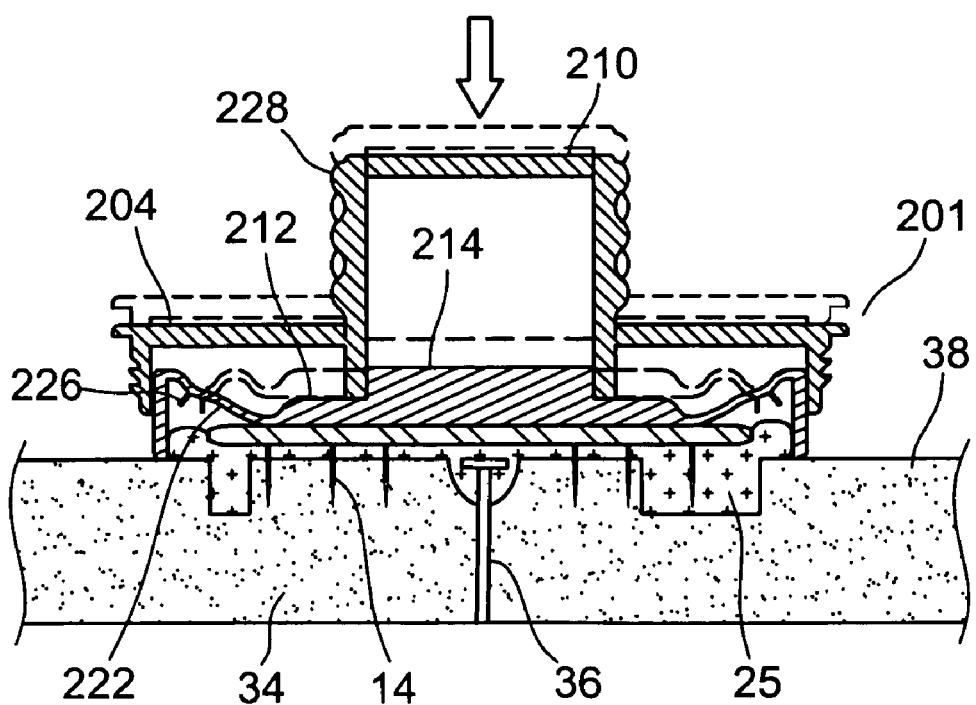
FIG. 9 is a cross sectional view of the tire patch of FIG. 7 in a plunger mode for direct application to a tire puncture with the outer shell removed.

In addition, vertical wall 220 terminates short of the tips of pins 14 so that pins 14 may be the first to touch the tire 34 and fully lodged in tire 34 within a shorter travel of push rod 210 as shown in FIG. 9. Extending downwardly from a valley 224 of furrows 222 are discrete vertical wall sections 226 for normally abutting the circumference of base 12 but releasing the same as furrows 222 stretch down.

Upon assembly of outer shell 204 and inner shell 212, vertical wall 220 may be located partially inside sidewall 206 of outer shell 204 so that push rod 210 and press plate 218 can make short straight travels under the guidance of vertical wall 220 as FIG. 9 illustrates contained patch 200 with lid 202 removed has been applied to cover tire 34 over penetrating nail 36. A side grip 228 formed around push rod 210 facilitates holding the contained patch 200 for removal of lid 202 and centering patch 10 about the tire puncture identified. Manipulating applicator 201 is as easy as positioning the operator's palm over push rod 210 laid on the tire puncture. Pressing down on push rod 210 with the palm of a hand, the operator may comfortably and effectively tack the patch 10. And the low profile of applicator 201 helps to apply patch 10 at various positions of the tire puncture with respect to the vehicle body. As nails 14 claw hold of a depth of tire 34, sealant 25 conforms the irregularities of tread section 38 to increase the adherence of patch 10. Then, applicator 201 may be lifted off patch 10 without an interference leaving patch 10 appropriately adhering to tire 34. Blocking the puncture is effective as immediate as the one-touch tacking of patch 10 and a distance of normal driving of the vehicle will automatically perfect the protective blending of patch 10, tire 34 and the cause of puncture 36.

Therefore, while the presently preferred form of the emergency long drive patch for tire puncture has been shown and described, and several modifications thereof discussed, persons skilled in this art will readily appreciate that various additional changes and modifications may be made without departing from the spirit of the invention, as defined and differentiated by the following claims.

The invention claimed is:

1. An external puncture-sealing patch for a vehicle tire comprising:
   a base that is thin and flexible for attachment to the exterior of the tire, the base having a top surface and a bottom surface;
   a number of sharp pins partially implanted in the base in a radial arrangement around a central void protruding vertically downward from the bottom surface of the base to form a large spiked pad for penetratively engaging a depth of the tire about its puncture upon depression onto the top surface of the base; and
   a thick coat of an elastomeric sealant on the bottom surface of the base for sealingly adhering the spiked pad to the tire as the sealant fills any irregular clearances between the spiked pad and tire to reinforce the attachment thereof, wherein the base has two layers bonded together, the respective layers having a number of concentric annular grooves facing inwardly of the base in an opposing manner for firmly holding the implanted pins by an extra amount of glue that fills the grooves and the rest of the opposing layers.

2. A contained patch for an external application to a puncture of a vehicle tire comprising:
   a base that is thin and flexible for attachment to the exterior of the tire, the base having a top surface and a bottom surface;
   a number of sharp pins partially implanted in the base in a radial arrangement around a central void protruding vertically downward from the bottom surface of the base to form a large spiked pad for penetratively engaging a depth of the tire about its puncture upon depression onto the top surface of the base;
   a thick coat of an elastomeric sealant on the bottom surface of the base for sealingly adhering the spiked pad to the tire as the sealant fills any irregular clearances between the spiked pad and tire to reinforce the attachment thereof; and
   a plunger for protectively containing the spiked pad before its application, the plunger having a shell extending generally vertically and centrally opened to receive the spiked pad, a pusher partially received in the shell so that it normally extends above the shell and abuts at least partial areas of the top surface of the base of the patch where the pins are implanted, an elongated top lid to the shell for removably capping the pusher until it acts on the spiked pad during application, and a bottom closure removably capped on the shell from below, whereby an operator may hold the spiked pad by the plunger in one hand with the top lid and bottom closure removed to press the pusher with the thumb of the same hand or with another hand along a straight path onto the patch centrally aligned to the tire puncture to seal the same.

3. The contained patch of claim 2, wherein the plunger is made of plastic and is reusable to contain a new supply of spiked pad.

4. The contained patch of claim 2, wherein the base is molded of a molten rubber material similar to the tire with the pins partially immersed in the molten material to finish the spiked pad in a single step.

5. The contained patch of claim 2, wherein the pins are metal thumbtacks.

6. The contained patch of claim 2, wherein the pins comprise a plurality of sharp elements of metal each having dual prongs and a flattened head connecting the two prongs, the flattened head providing an enlarged area for a stronger attachment to the base.

7. The contained patch of claim 2, wherein the base has two identical layers bonded together, the respective layers having a number of concentric annular grooves facing inwardly of the base in an opposing manner for firmly holding the implanted pins by an extra amount of glue that fills the grooves and the rest of the opposing layers.

8. The contained patch of claim 2, wherein the base has two flat layers bonded together by thick glue, through which the implanted pins penetrating one of the two layers while the other layer provides an enlarged press surface for manual or mechanical depression onto the tire.

* * * * *